United States Patent [19]

Elson

[11] Patent Number: 5,593,477
[45] Date of Patent: Jan. 14, 1997

[54] GAS AND ODOR ABSORBER

[75] Inventor: Edward E. Elson, 4356 Claytor Cir., Anaheim, Calif. 92807

[73] Assignee: Edward E. Elson, Anaheim, Calif.

[21] Appl. No.: 300,043

[22] Filed: Sep. 2, 1994

[51] Int. Cl.6 .................................................. B01D 53/04
[52] U.S. Cl. ............................... 96/108; 96/152; 55/275; 55/512; 55/516
[58] Field of Search ........................... 96/108, 139, 152; 55/274, 275, 471–473, 512, 515, 516, 518, 519

[56] References Cited

U.S. PATENT DOCUMENTS

| 2,294,183 | 8/1942 | Holm-Hansen | 96/152 |
| 2,511,497 | 6/1950 | Dauphinee | 96/152 |
| 2,557,557 | 6/1951 | Newcum | 96/152 X |
| 2,575,234 | 11/1951 | Race, Jr. | 55/275 |
| 2,594,108 | 4/1952 | Woodbridge | 96/152 |
| 2,621,753 | 12/1952 | Urdahl | 55/275 X |
| 3,171,726 | 3/1965 | Roney et al. | 55/275 X |
| 3,505,783 | 4/1970 | Graham | 55/275 X |
| 3,891,417 | 6/1975 | Wade | 96/139 |
| 4,010,014 | 3/1977 | Barnebey et al. | 96/108 X |
| 4,088,461 | 5/1978 | Brauer | 55/275 |
| 4,278,453 | 7/1981 | Klein | 55/275 X |
| 4,339,250 | 7/1982 | Thut | 96/139 X |
| 4,838,901 | 6/1989 | Schmidt et al. | 96/139 X |
| 4,875,914 | 10/1989 | Wireman | 55/471 X |
| 5,141,539 | 8/1992 | Hiouani | 96/108 |

FOREIGN PATENT DOCUMENTS

| 3204022 | 8/1983 | Germany | 96/108 |
| 52-054682 | 5/1977 | Japan | 96/152 |
| 61-178018 | 8/1986 | Japan | 96/152 |
| 62-161095 | 7/1987 | Japan | 96/108 |
| 5-192529 | 8/1993 | Japan | 96/108 |
| 2109268 | 6/1983 | United Kingdom | 96/139 |

Primary Examiner—Robert Spitzer

[57] ABSTRACT

A device for removing odors and undesirable gases from ambient air comprising an absorbent material enclosed in a tubular shaped container designed to encourage flow of the ambient gases through the container and over and through the absorbent material. In particular, the container includes a plurality of rising channels within the wall of the container, each channel having an opening to the interior space in the vessel, the interior space holding the absorbent material.

6 Claims, 4 Drawing Sheets

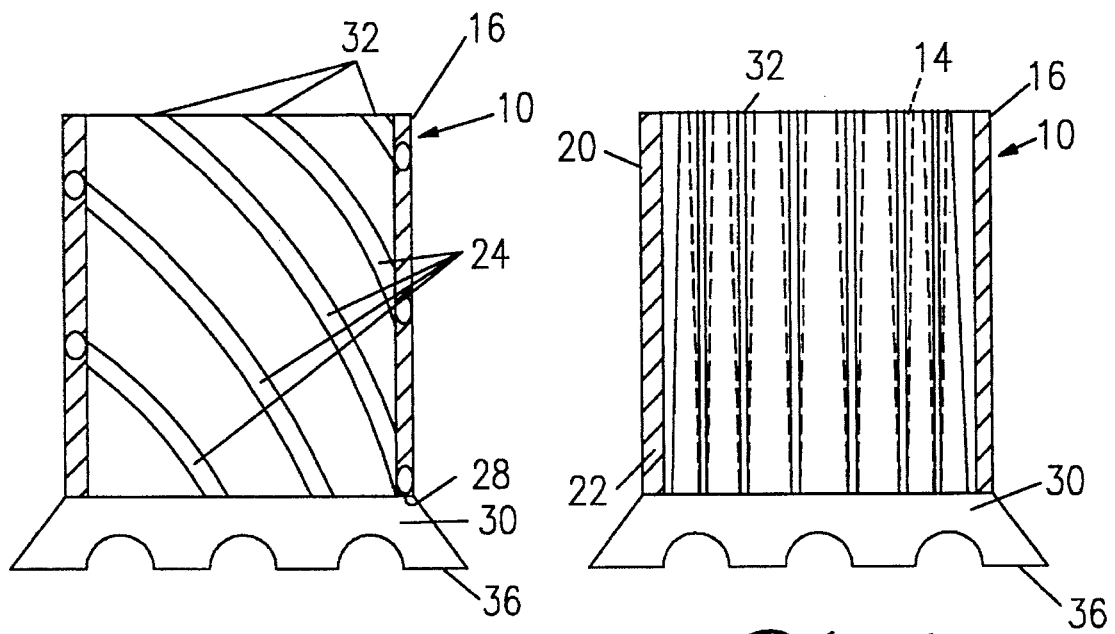
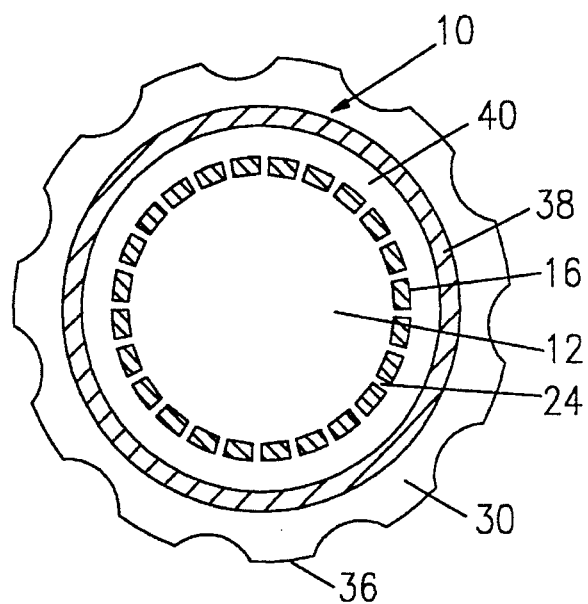

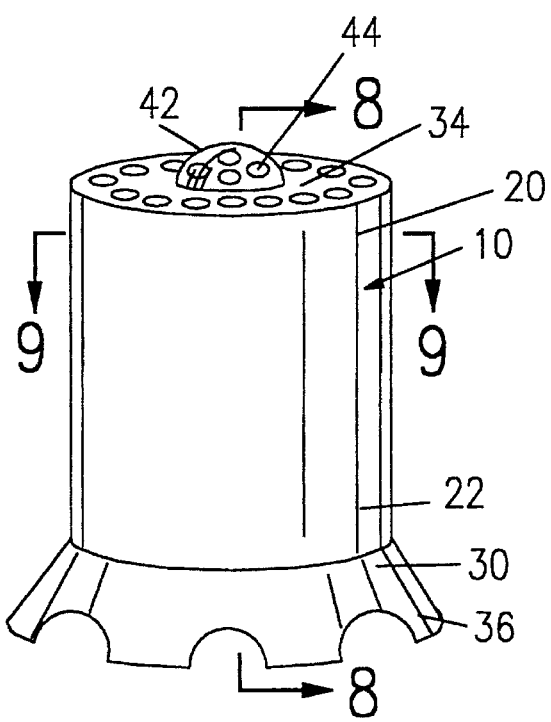
fig.7
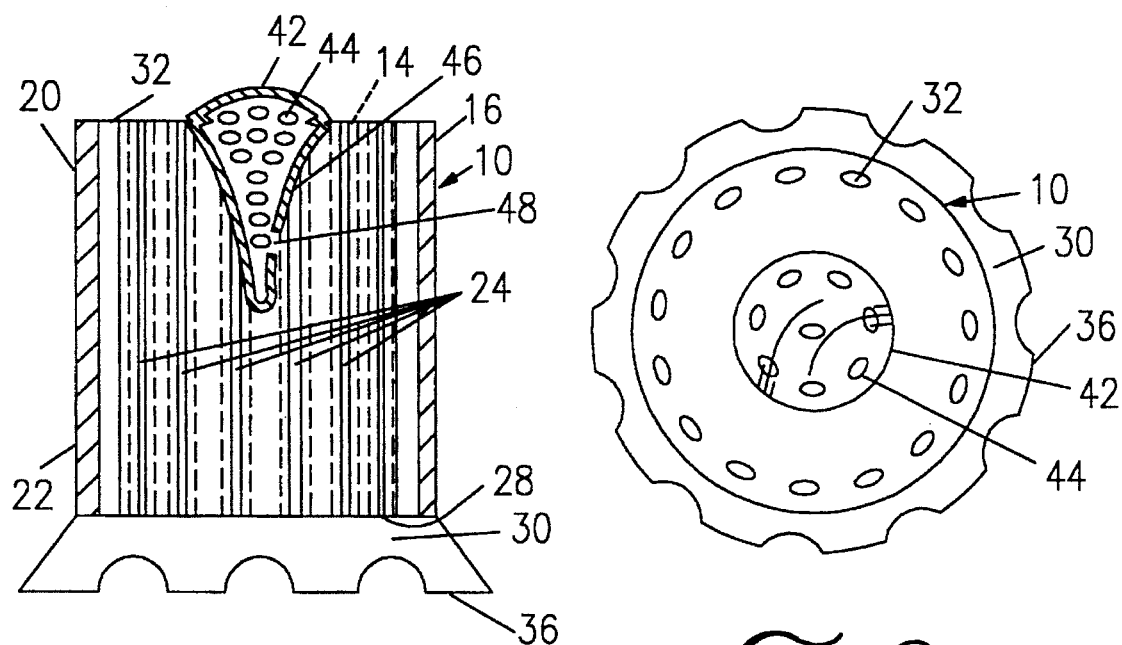
fig.8
fig.9

GAS AND ODOR ABSORBER

BACKGROUND

The present invention relates to a device for improving the removal of odors and undesirable gases from surrounding ambient gases such as air using absorbent material by enclosing the absorbent material in a container designed to more efficiently distribute the odors and gases through the absorbent material.

It is well known that absorbent materials, such as molecular sieves or beads of absorbent materials when exposed to ambient gases will absorb many different gaseous components and odors as well as moisture from the surrounding air. However, the absorption proceeds in an uncontrolled manner, the rate being dependent on the amount of exposed absorbent surface and the flow of gases over the absorbent surface. The process can be improved by increasing the flow of the surrounding gases over the exposed surface by installing fans. However, the uncovered absorbent material is subject to spillage or being blown from the container by the fan.

Another alternative is to enclose the absorbent in a canister and force the gases through the bed of absorbent material using blowers. However, this apparatus can be bulky and is not energy efficient as it must be plugged into an electrical outlet. Additionally, the absorbent material tends to preferentially absorb moisture from the air forced through it, thus significantly reducing the ability of the material to absorb the odors and gaseous components which the device is intended to remove.

A more energy efficient system is shown in U.S. Pat. No. 4,875,914 which employs a canister having a vertical foraminous tube centrally located therein, the tube being surrounded by the absorbent material, such as beads of a molecular sieve material which fills the canister. Air having odors or undesirable gases therein, as well as moisture, is caused to flow through the tube. It was found that the odor or gases are preferentially absorbed in the molecular sieve while moisture is absorbed at a much slower rate than when the air is forced directly through the absorbent. The device is disclosed to operate either as a static version, where the air rises through the device because of a chimney effect, or a more rapid and efficient device which uses a fan to draw the air through the tube. However, it has been found that absorption of odors and gases through this device is limited because only a limited percentage of the absorbent material is directly exposed to the gas or odor flowing through the foraminous tube, the porous area of the tube available for transmission is limited and the molecular sieve, once exposed to the odor or gas, can restrict the flow of additional gases or odor to the larger volume of absorbent spaced further from the tube. As such, the absorption rate of the prior art device can decrease significantly over a period of time.

Thus, there is a need for an assembly which is more efficient and effective in exposing the bulk of absorbent material to the substances to be absorbed.

SUMMARY

These needs are met by the present invention which comprises a tubular shaped vessel with an interior space for holding a volume of granular absorbent material, wherein the wall of the vessel includes a plurality of hollow, rising channels. An opening to the interior space in the vessel extends along the length of each channel. The lower end of each channel has an entry port open through the base of the vessel and the upper end of each channel has an exit port open through the top of the vessel so that ambient air is free to flow into the channels through the entry port, into the absorbent material through the wall opening in the channel and exit, with at least a portion of the odor and/or gas removed therefrom without causing a lower portion of the granular absorbent material to collect moisture and limit odor absorption.

Further, the interior space may be partially open at the bottom but closed at the top so that ambient air can freely flow into the interior space, through the granular absorbent material and out through a channel.

DRAWINGS

These and other features, aspects and advantages of the present invention will become better understood with reference to the following description, appended claims, and accompanying drawings, where:

FIG. 4 is a cutaway view of the invention taken along line 2—2 of FIG. 1 showing a second embodiment.

FIG. 5 is a cutaway view of the invention taken along line 2—2 of FIG. 1 showing a third embodiment.

FIG. 6 is a cutaway view of the invention taken along line 3—3 of FIG. 1 showing a fourth embodiment.

FIG. 7 is a front perspective view of the invention showing a fifth embodiment of the invention.

FIG. 8 is a side cutaway view of the invention taken along line 8—8 of FIG. 7.

FIG. 9 is a top view of the invention taken along line 9—9 of FIG. 7.

DESCRIPTION

Figure 1:
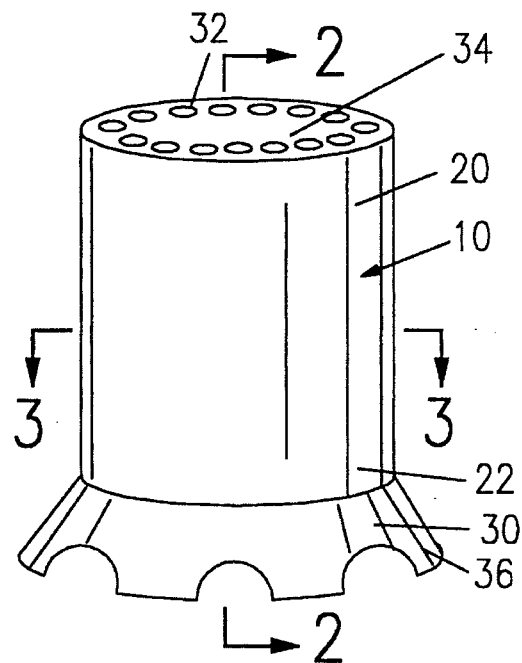
FIG. 1 is a front perspective view of the invention.
Figure 2:
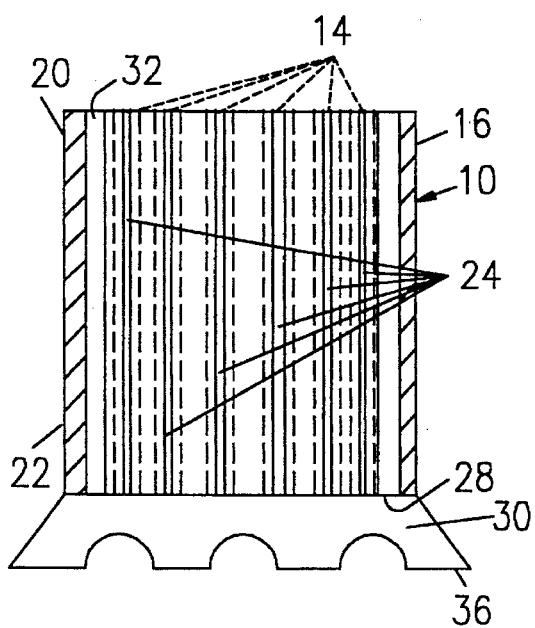
FIG. 2 is a side cutaway view of the invention taken along line 2—2 of FIG. 1.
Figure 3:
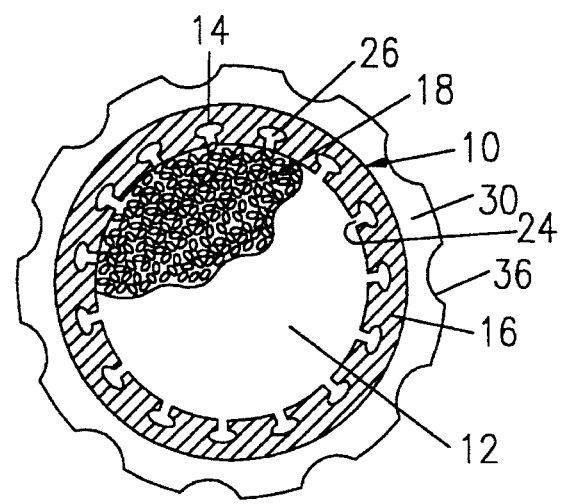
FIG. 3 is a cutaway view of the invention taken along line 3—3 of FIG. 1.

FIGS. 1–3 show various views of the invention which comprises a cylindrical shaped vessel 10 which contains a central area 12 surrounded by a wall 16 and tubular channels 14 spaced from each other within the wall 16 of the vessel 10. The central area 12 is filled with a granular absorbent material 18 and is closed at the top 20 and bottom 22. For clarity, the granular absorbent material 18 is only shown in FIG. 3 and in that instance it is shown only filling a portion of the central area 12. The inner surface of the wall 16 has openings 24 therethrough which extend at least partially along the length of the tubular channels 14 connecting the space 26 within the channels 14 with the central area 12.

The channels 14 extend from a bottom opening 28 in the base 30 of the vessel 10 to a top opening 32 in the lid 34 of the vessel 10. Depending from the base 30 are legs 36 which serve to space the base 30 and the bottom openings 28 away from a surface upon which the vessel 10 is placed to allow air circulation under the vessel 10.

Since heat rises, the air in the space 26 at the upper end of the channel 14 is warmer than the air at the bottom end of the channel 14, as a result, the chimney effect causes the air in the channels to rise. As the air moves up the channels 14, it diffuses through the openings 24 in the wall into the central area 12 and moisture, chemicals or odors in the air are absorbed by the granular absorbent material 18. The air reaching the top 20 of the central area 12 then flows back through the openings 24 returning to the upper portion of the channel 14 and subsequently through the top opening 32 to the outside environment. Because of the chimney effect, there is no need to add a mechanical driving force or heat to move the air.

FIG. 2 is a cutaway view showing several openings 24 arranged vertically around the wall. The channels are shown in phantom.

FIG. 3 is a cross-sectional view showing the tubular channels 14 within the wall 16 and the openings 24 connecting the channels 14 to the central area 12.

The placement of the channels 14 around the circumference of the vessel 10 allows more absorption of odors than the prior art devices because each channel exposes the air stream to a small area of the main area 12. As a result, more odor, chemicals and moisture can be absorbed before the granular material becomes loaded and acts to block further treatment than in the prior design which has a central foraminous tube surrounded by the absorbent. Additionally, the channels 14 may be integrally formed within the wall 16, eliminating the need for a separate tube and the assembly thereof.

In a first alternative, shown in FIG. 4, the channels form a spiral up the wall, thus containing a greater volume of air then straight channels and exposing more air to the absorbent 18.

In a second alternative embodiment shown in FIG. 5, the channel 14 is tapered from the bottom to the top of the tube. Alternatively, the top of the channel can be larger than the bottom of the channel or the bottom of the channel can be larger than the top of the channel. This can result in greater flow through the unit.

The above described embodiments have the channels 14 within the wall of the vessel 10 with openings 24 connecting the central area 12 and space 26 in the channel. The device, as shown in FIG. 6, can also be constructed with the openings 24 fully piercing the wall 16 the vessel 10 being fully surrounded by an outer wall 38 which encloses an annular space 40 which functions in the same manner as the channels 14. Alternatively, individual hollow tubes can be attached to the outer surface of the wall 16 with openings 24 therein which coincide with the openings 24 in the wall 16.

FIGS. 7–9 show an alternative embodiment of the invention which is substantially the same as the first embodiment with the addition of means to ascertain that the granular absorbent material has reached its capacity for absorbing odors, chemicals or moisture. In particular, the embodiment of FIGS. 7 and 9 includes a transparent dome 42 mounted on a porous housing 46 centered in the lid 34. Beneath the dome 42 are granules 44, of an indicator material sensitive to the presence of moisture or specific chemicals. Typical of the indicator materials that may be used is silica gel including a chemical which changes from blue to pink indicating a moisture content of greater than 35%.

FIG. 8 is a cutaway view of FIG. 7 taken along line 8—8 showing the indicator housing 46 with at least one opening 48 in its wall. Gases containing odors, chemicals or moisture enter the indicator housing 46 filled with the granular indicator material 44 once the gas has penetrated into the central space 12, of the vessel 10. As the odors, chemicals or moisture are absorbed by the granules 44, a color change will first take place at or near the center of the vessel 10 and then progressively towards the top of the indicator housing 46. As the absorption of odors, chemicals or moisture by the granules 44 proceeds in the color change will become visible through the dome 42 indicating to the user that the capacity of the granular absorbing material 18 in the vessel 10 has been reached and that it should be replaced by fresh material.

The percent by weight of odors, chemicals and moisture that can be absorbed by the granular absorbing material 18 is proportional to their concentrations in the air passing through the vessel. Natural zeolites and other specially formulated molecular sieve materials may absorb various chemicals and moisture up to approximately 35% by weight of the granular absorbing material 18 contained within the vessel. The granules 44 can be so formulated to change color to match the absorption capacity of selected compounds carried by the air stream through the vessel 10.

Figure 10:
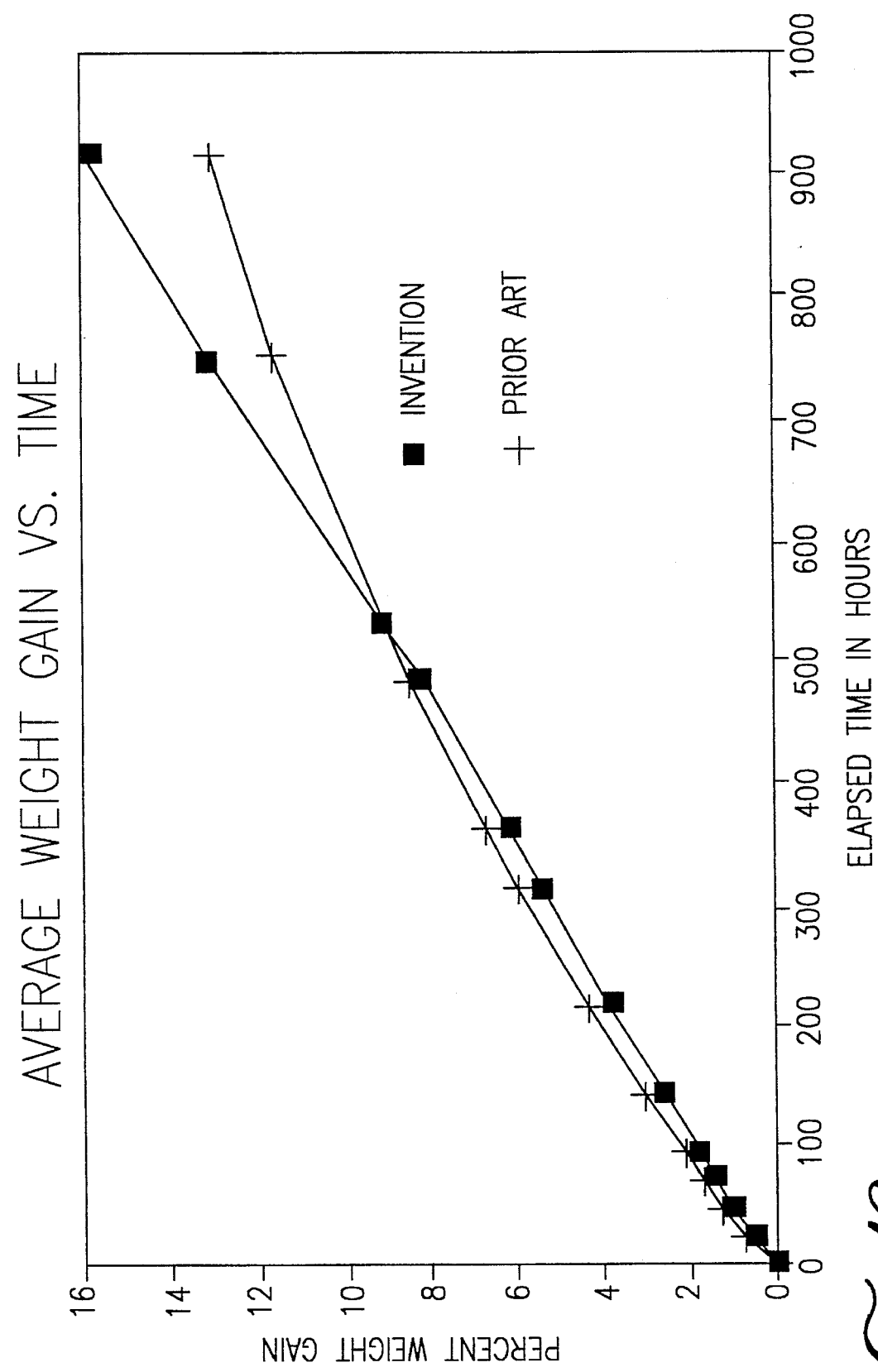
FIG. 10 depicts the moisture uptake of the device during 750 hours of operation.

FIG. 10 shows the change in weight of the granular absorbing material 18 as it absorbs water vapor as a function of time at a given temperature and relative humidity. The moisture gain is directly proportional to the amount of gas permitted into the vessel 10.

FIG. 10 shows the moisture uptake in experimental models of the claimed device constructed in the form of the invention depicted in FIGS. 1 and 7 and the prior art device (U.S. Pat. No. 4,875,914) under the same ambient conditions. The lesser moisture pickup rate in hours 0–450 are a result of the total area of the channels being less than the area of the openings in the foraminous tube of the prior art. It is believed that the moisture pickup of the device as shown in FIG. 1 can be increased by increasing the number of channels or increasing the width of the channels to increase the mass flow into the absorbent media in the vessel. Also it has been discovered that the absorption rate for the prior art device decreases over extended periods of time (beyond 450 hours in the comparison shown) as a result of the absorption media nearest the central foraminous tube becoming laded with absorbed gases, odors or moisture and retarding transmission to the rest of the absorption material. This is evidenced by the crossover of the curves shown in FIG. 10 after about 520 hours of operation.

While a fan or added heat is not necessary for the unit to function, the efficiency and flow of air through the unit can be increased by adding a fan to the top or bottom of the unit, thus driving air through the channel 14. Additionally or alternatively, a heater can be placed anywhere along the length of the channel or above or below the unit to warm air in the tube and enhance the chimney effect. In each instance, a low energy source such as a battery or solar cell can be used to drive the fan or heater.

Although the present invention has been described in considerable detail with reference to certain preferred versions and uses thereof, other versions and uses are possible. For example, the cross-section of the vessel 10 or channels 14 can be a many sided figure or an ellipse. Also, if the tubes are heated or turbulence is created to warm the tubes, the chimney effect is more pronounced and more air is processed through the system. Further, certain colors are known to absorb incident energy causing the underlying surface to be a different temperature from the surrounding area which is a different color, i.e., white vs. black. Still further, several vessels 10 can be mounted next to each other such as in a tubular wind chime producing a decorative device as well as a useful object. Therefore, the spirit and scope of the appended claims should not be limited to the description of the preferred versions contained herein.

What is claimed is:

1. A device for filtering gases comprising:

a) a vessel having an outer wall, a closed top and a bottom enclosing a central area, the central area having a vertical axis extending from the top to the bottom, the central area being filled with granular absorbent material; and b) a plurality of channels within the wall, said channels arranged around the central area and positioned so a vertical axis passing through any one of the plurality of channels is oriented in substantially the same orientation as the vertical axis of the central area, each channel having an opening extending at least a portion of the distance from the bottom to the top connecting a space in each channel to the central area.

2. The device for filtering gases of claim 1 further comprising an indicator means centrally placed to provide indication that the granular absorbing material has reached its absorptive capacity of odor molecules, chemical compounds and moisture and needs to be replaced.

3. A device of claim 2 wherein the indicator means are contained in a structure with openings communicating with the granular absorbing material.

4. A device of claim 2 wherein the indicator means are contained in a structure with a transparent upper surface to permit viewing of the indicator means.

5. A device for filtering gases comprising:

a) a vessel having an outer wall, a closed top and a bottom enclosing a central area, the central area having a vertical axis extending from the top to the bottom, the central area being filled with granular absorbent material; and b) a plurality of channels contained within the wall, said channels arranged around the central area and extending from the bottom to the top of the vessel and having an entrance port through the bottom and an exit port through the top, each of the channels having an opening extending at least a portion of the distance from the bottom to the top connecting a central elongated space in each channel to the central area of the vessel, the opening being sized to allow air entering any channel through the entrance port to pass through said channel and into the central area but prevent granular absorbent material in the central area from entering said channel.

6. The device of claim 5 further including an absorbent status indicator centrally located in the top of the vessel.

* * * * *